March 17, 1970     A. M. HALLEY     3,500,976

ROTARY DRIVE COUPLINGS

Filed May 17, 1968     2 Sheets-Sheet 1

INVENTOR

ANGUS MURRAY HALLEY

ATTORNEYS

March 17, 1970     A. M. HALLEY     3,500,976

ROTARY DRIVE COUPLINGS

Filed May 17, 1968     2 Sheets-Sheet 2

INVENTOR

ANGUS MURRAY HALLEY

*Norris & Bateman*

ATTORNEYS

United States Patent Office 3,500,976
Patented Mar. 17, 1970

3,500,976
ROTARY DRIVE COUPLINGS
Angus Murray Halley, Birmingham, England, assignor to James Halley & Sons Limited, West Bromwich, England, a British company
Filed May 17, 1968, Ser. No. 729,990
Claims priority, application Great Britain, May 23, 1967, 23,832/67
Int. Cl. F16d *11/06;* F16l *21/00*
U.S. Cl. 192—29                         6 Claims

ABSTRACT OF THE DISCLOSURE

A rotary drive coupling, especially for coupling rotary web processing cylinders, and comprising first and second coupling members wherein one or more rotatable D-shape pins on one member are manually engageable with any of a plurality of equi-spaced recesses of the other member to effect engagement of the members in a selected one of a number of alternative angular positions.

---

This invention concerns rotary drive couplings more particularly, but are not exclusively, for the transmission of rotary drive to printing, embossing, or cutting cylinders of paper web processing machinery.

In practice it is often required to adjust the relative angular positions of a driven and a driving member, for example the driven cylinder with respect to its drive in a paper web processing machine, to give adjustment of registration between two successive operations on a web. This invention has for its principal object the provision of a device which facilitates the aforesaid type of angular adjustment.

The invention consists of a rotary drive coupling device comprising a first rotatable member having a plurality of equidistant recesses, a second rotatable member, and at least one drive transfer element rotatably mounted on the second member so that in one angular position of the element with respect to the second member the element engages within a selected recess of the first member to establish a driving connection between the two members with a selected relative angular position between the two members, whereas in a second angular position of the element with respect to the second member the element is disengaged from the first member to permit relative rotation of the members.

One embodiment of the invention is described, by way of example only, with reference to the accompanying drawings wherein.

Figure 1:
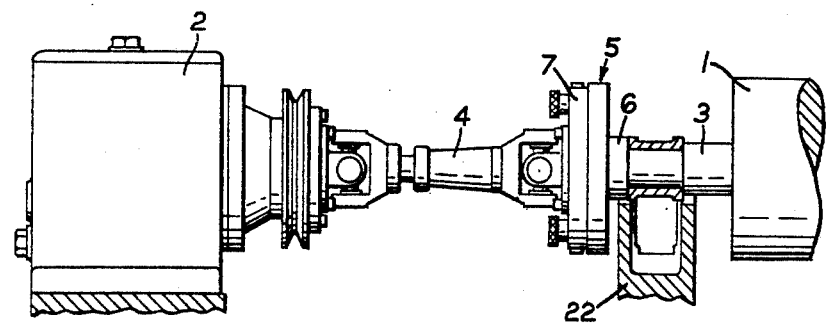
FIGURE 1 is a part sectional end elevation showing the drive connection to a web printing cylinder according to the invention.
Figure 2:
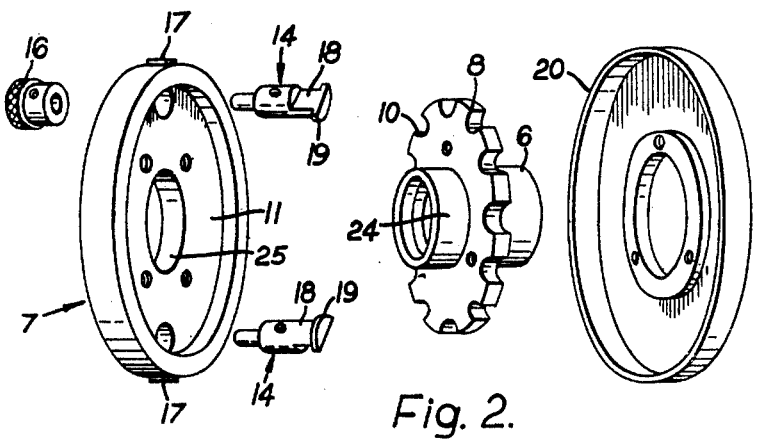
FIGURE 2 is an exploded perspective view on an enlarged scale of the coupling device embodied in FIGURE 1.

Referring initially to FIGURE 1 of the drawings the rotary drive of a printing cylinder 1 is obtained via a respective bevel gear box 2 driven by a main drive shaft (not shown) serving a plurality of bevel gear boxes and cylinders of a multi-stage printing apparatus. The output shaft of each bevel gear box 2 is connected to its respective printing cylinder shaft 3 by a Cardan shaft 4 and a realesable drive coupling device 5 having a first member 6 fastened to the end of the cylinder shaft 3 and a second member 7 connected to the end of the Cardan shaft 4 remote from the gear box 2.

Referring now to FIGURES 2–6, the first member 6 of the coupling device 5 comprises a disc flange 8 which is secured by a key 9 to the end of the printing cylinder shaft 3, and the periphery of the disc is formed with a plurality of equidistant semi-cylindrical recesses 10. The second member 7 of the coupling consists of a circular plate 11 fastened by bolts 12 to the end plate 13 of the Cardan shaft 4. The plate 11 carries two diametrically opposed drive transfer elements 14 each in the form of a generally cylindrical pin 15 to which are fastened knurled head pieces 16 exposed on the Cardan shaft side of the plate to permit manual rotation of the pin through 180° between the two positions shown in FIGURES 5 and 6 as located by respective spring loaded selectors 17 incorporated in the plate 11. A part of each pin 15 is exposed from the opposite side of the plate 11 to the pin heads 16 and has a semi-circular cross section 18 complementary to the shape of the coupling disc recesses 10.

Figure 3:
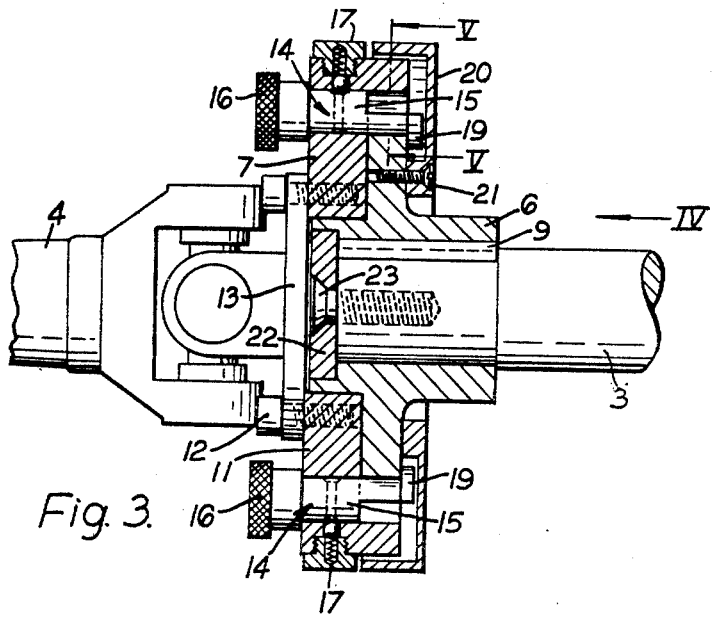
FIGURE 3 is a part sectional fragmentary view of a part of FIGURE 1 but on an enlarged scale.
Figure 4:
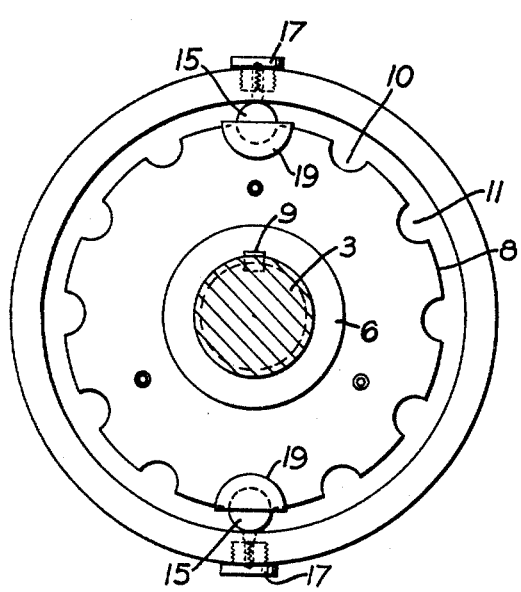
FIGURE 4 is a view in the direction IV of FIGURE 3 with certain parts removed for clarity.
Figure 5:
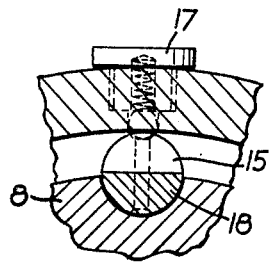
FIGURES 5 and 6 are fragmentary views on an enlarged scale taken on lines V—V of FIGURE 3 and showing their parts in two alternative settings.
Figure 6:
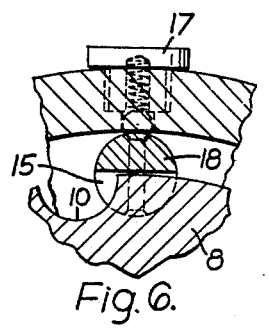

The axes of rotation of the pins 15 lie on the pitch circle of the recesses 10 so that in a first of the two positions of the pins their semi-cylindrical parts 18 engage with minimum lost motion in the selected pair of recesses 10 in the coupling disc 8 as shown in FIGURES 3, 4 and 5, and in this positions prevent relative angular movement between the two members 6 and 7, of the coupling. By turning the pins 15 from their first to their second positions as shown in FIGURE 6 their semi-cylindrical parts 18 progressively move out of engagement with the recesses 10 to permit relative angular movement between the two coupling members 6 and 7.

Advantageously the extreme ends of the pins beyond their semicylindrical parts have shoulders 19 serving to overlie the end face of the coupling disc 8 as the pins 15 engage in the disc recesses 10 thereby preventing axial separation of the coupling parts 6 and 7.

The member 6 is secured to the end of the shaft 3 by a retaining plate 22 and set screw 23, and the members 6 and 7 conveniently support one another in axial alignment by location of a part 24 of the member 6 within a complementary bore 25 of the member 7. A cover 20 is fastened by screws 21 to the member 6 to enclose the recessed part 8.

In use the printing cylinder 1 is positioned in the printing press 12 and, prior to connection of the coupling 6, 7 the cylinder is angularly adjusted to achieve approximate registration. With the printing cylinder in its requisite angular position with respect to the main drive, the Cardan shaft 4 is extended to position the coupling pins 15 about the coupling disc 8, and finally the pin heads 16 are manually rotated so that the semi-cylindrical parts 18 engage with the nearest pair of recesses 10 in the coupling disc. To remove or re-position the printing cylinder 1 it is only necessary to rotate the pins 15 through 180° so that they disengage from the coupling disc.

The separation between the individual coupling disc recesses 10 is such that the difference in registration provided by the two positions of the cylinder given by alternative engagement of two adjoining recesses, is within the scope of the adjustment provided by conventional fine adjustment means (not shown) such as for example a screw mounted roller.

It is found in practice that use of the above described type of coupling offers considerable saving in power as well as increased convenience, as compared with the prior use of for example a gear box having a disengageable gear.

I claim:

1. A rotary drive coupling comprising first and second relatively rotatable coupling members, a drive transfer element for connecting said members in drive transmitting relation rotatably mounted on one of said members and projecting toward the other member, a plurality of circumferentially spaced recesses on said other member, a substantially semi-circular cross section portion on said element engageable with and disengageable from any selected one of said recesses upon rotation of said element for coupling and uncoupling said members respectively, and shoulder means on said element for preventing axial separation of said members when said portion of said element is engaged in a selected recess.

2. The drive coupling defined in claim 1, wherein a circumferentially spaced plurality of said drive transfer elements are rotatably mounted on said one member for connecting said members.

3. The drive coupling defined in claim 1, further comprising rotatably engaged coaxial means on said coupling members for maintaining axial alignment.

4. The drive coupling defined in claim 3, wherein said coaxial means comprises a boss on one coupling member rotatably extending within a central bore in the other coupling member.

5. The drive coupling defined in claim 1, wherein said recesses are peripherally open recesses on said other member and there being a cover secured on said other member extending to enclose said recesses.

6. The drive coupling defined in claim 1, including means for connecting a Cardan shaft to one of said coupling members, and means for connecting a printing cylinder shaft to the other coupling member.

References Cited

UNITED STATES PATENTS

| | | | |
|---|---|---|---|
| 970,793 | 9/1910 | Carlson | 64—24 |
| 1,158,370 | 10/1915 | Campbell | 192—29 |
| 3,017,207 | 1/1962 | Lloyd | 192—71 X |
| 3,176,812 | 4/1965 | Towne | 287—130 X |

FRED C. MATTERN, Jr., Primary Examiner

W. S. RATLIFF, Jr., Assistant Examiner

U.S. Cl. X.R.

64—24; 192—71; 287—130